US005538782A

United States Patent [19]

Tomono et al.

[11] Patent Number: 5,538,782

[45] Date of Patent: Jul. 23, 1996

[54] PRINTING OFFSET BLANKET

[75] Inventors: Seiji Tomono, Kobe; Taketo Matsuki, Nishinomiya; Kazuhisa Fushihara, Kakogawa, all of Japan

[73] Assignee: Sumitomo Rubber Industries, Ltd., Kobe, Japan

[21] Appl. No.: 510,305

[22] Filed: Aug. 2, 1995

[30] Foreign Application Priority Data

| | | | |
|---|---|---|---|
| Aug. 11, 1994 | [JP] | Japan | 6-189601 |
| Aug. 11, 1994 | [JP] | Japan | 6-189602 |
| Aug. 19, 1994 | [JP] | Japan | 6-195634 |

[51] Int. Cl.[6] .......... B32B 7/00

[52] U.S. Cl. .......... 428/250; 428/246; 428/304.4; 428/909

[58] Field of Search .......... 428/246, 250, 428/909, 304.4

[56] References Cited

U.S. PATENT DOCUMENTS

| | | | |
|---|---|---|---|
| 5,116,669 | 5/1992 | Sonobe | 428/909 |
| 5,356,693 | 10/1994 | Tomono et al. | 428/909 |
| 5,478,637 | 12/1995 | Tomono et al. | 428/909 |

*Primary Examiner*—James J. Bell

*Attorney, Agent, or Firm*—Nikaido, Marmelstein, Murray & Oram

[57] ABSTRACT

There is provided an offset blanket which is particularly superior in paper discharging properties at the time of printing, comprising a supporting layer and a surface printing layer provided on the supporting layer, and the surface printing layer is a rubber layer wherein a volume change $\Delta V$ (%) and a tan $\delta$ satisfy a relation represented by the formula:

$$\tan\delta < -0.0018 \times \Delta V + 0.34 \quad (1)$$

or a relation between a hardness Hs (IHRD) and a tan $\delta$ satisfy a relation represented by the formula:

$$\tan\delta < -0.005 \times Hs + 0.42 \quad (3).$$

8 Claims, 3 Drawing Sheets

PRINTING OFFSET BLANKET

BACKGROUND OF THE INVENTION

This invention relates to a printing offset blanket. More particularly, it relates to a printing offset blanket having a surface printing layer, which is superior in printability at the time of high-speed printing, particularly paper discharging properties.

Offset blankets to be used for gravure offset printing are normally formed by providing a surface printing layer on a supporting layer which may have a porous compressive layer in the interior thereof, and the surface printing layer is composed of a layer of a rubber having an elastic modulus and an oil resistance, such as acrylonitrile-butadiene rubber (NBR).

However, when high-speed printing is conducted using a normal offset blanket, an adhesion arises between a paper as a material to be printed and the offset blanket, thereby causing a problem that the paper curls and tears. The similar problem arises at the time of printing on a paper having a smooth surface, such as coat paper. Furthermore, when a normal offset blanket is used for a web offset printing press, such a problem arises that a paper is caught with the offset blanket to cause misregistering, or tearing and scumming of the paper, i.e. so-called delamination arises.

These problems are caused on the ground that the offset blanket is not rapidly separated from the paper, i.e. so-called paper discharging properties are inferior. Since such a problem deteriorates a printing precision and a productivity, considerably, it has hitherto been requested to improve the paper discharging properties of the offset blanket.

As the method of improving the paper discharging properties of the offset blanket, for example, there is suggested a method of making the surface of the surface printing layer rough or a method of increasing a hardness of the surface printing layer. However, according to the former method, the shape of a dot to be formed on the offset blanket becomes inferior, which results in deterioration of a reproducibility of the spot. In addition, according to the latter method, an applicability of ink at the solid portion having a 100% dot surface, i.e. a so-called solid applicability, becomes inferior. That is, there is a problem that the printing precision is deteriorated in both methods.

There is also suggested a method of coating the surface of the surface printing layer with polyvinyl chloride, polyvinyl acetate, silicone rubber, etc. This method causes a problem that the number of steps is increased in the production process of the offset blanket.

Furthermore, there is suggested a method of modifying the surface of the surface printing layer by irradiating ultraviolet ray on the surface of the surface printing layer (Japanese Laid-Open Patent Publication No. 51-37706) or subjecting to a chlorination treatment (Japanese Laid-Open Patent Publication No. 47-51729). However, both methods cause a problem that the number of steps is increased in the production process of the offset blanket and a working atmosphere becomes inferior.

On the other hand, a problem that a paper powder is liable to separate from the surface of the paper by contacting with the offset blanket is caused by the fact that the paper discharging properties of the offset blanket is inferior, as described above. Such a paper powder is accumulated on the surface printing layer of the offset blanket by the long-term printing, thereby causing inclusion of the paper powder into ink. As a result, such a printing failure that white spots are formed at the printed portion arises. Since an opportunity to use a regenerated paper having an inferior paper quality has recently been increasing according to energy saving, recycling, etc., the above problem becomes serious. Furthermore, the surface of the blanket must be frequently washed so as to prevent the printing failure due to inclusion of the paper powder and, therefore, it becomes a problem that a printing operation becomes complicated due to the addition of a washing step.

SUMMARY OF THE INVENTION

It is a main object of this invention to provide a printing offset blanket wherein paper discharging properties is improved without causing deterioration of printing quality, increase in steps of making the offset blanket, etc.

It is another object to provide a printing offset blanket wherein retention of paper powder, solid applicability and durability are improved.

In order to accomplish these objects, the offset blanket of this invention comprises a supporting layer which may have a porous compressive layer, and a surface printing layer provided on the supporting layer; and the surface printing layer is a rubber layer wherein a volume change $\Delta V$ (%) obtained when it is swelled by immersing in toluene at a liquid temperature of 40° C. for 24 hours and a tan $\delta$ (dielectric loss tangent) obtained when a dynamic stress, satisfy a relation represented by the formula:

$$\tan \delta < -0.0018 \times \Delta V + 0.34 \quad (1).$$

The borderline represented by the formula (1) is shown by the symbol (i) in FIG. 1.

Preferably, the surface printing layer is a rubber layer wherein the volume change $\Delta V$ (%) and tan $\delta$ satisfy a relation represented by the formula:

$$\tan \delta < -0.0015 \times \Delta V + 0.28 \quad (2).$$

The borderline represented by the formula (2) is shown by the symbol (ii) in FIG. 1.

Another offset blanket of this invention comprises a supporting layer which may have a porous compressive layer, and a surface printing layer provided on the supporting layer; and the surface printing layer is a rubber layer wherein a hardness Hs (IRHD, hardness measured according to ASTM D1415-83) and a tan $\delta$ obtained when a dynamic stress is applied, satisfy a relation represented by the formula:

$$\tan \delta < -0.005 \times Hs + 0.42 \quad (3).$$

In this offset blanket, the same effect as that described above can be obtained. The borderline represented by the formula (3) is shown by the symbol (iii) in FIG. 2.

More preferred surface printing layer is a rubber layer wherein the hardness Hs and tan $\delta$ satisfy a represented by the formula:

$$\tan \delta < -0.0056 \times Hs + 0.43 \quad (4).$$

The borderline represented by the formula (4) is shown by the symbol (iv) in FIG. 2.

Regarding still another offset blanket of this invention, the surface printing layer is formed of a rubber composition comprising 100 parts by weight of a rubber material, 10 to 1 parts by weight of a zinc oxide and not more than 15 parts by weight of an inorganic filler or reinforcer other than zinc oxide.

That is, the inorganic filler or reinforcer is added in the rubber material for the purpose of maintaining a mechanical strength and extending. However, it has been found that the inorganic filler or reinforcer other than zinc oxide may not be added at all or it's amount to be added is reduced in comparison with a conventional case in order to improve the paper discharging properties, to prevent the paper powder from accumulating and to improve the solid applicability and durability. The zinc oxide is the filler or reinforcer which also serve as a vulcanization accelerator.

As apparent from the Examples described later, it is most preferred that the surface printing layer has not contain the inorganic filler or reinforcer other than zinc oxide at all, that is, it's amount to be added is zero, in view of improvement of the paper discharging properties, prevention of accumulation of the paper powder and improvement of the solid applicability and durability.

Other objects and advantages of this invention will become apparent to those skilled in the art from the following description with reference to the accompanying drawings.

DETAILED DESCRIPTION OF THE INVENTION (I) Surface printing layer having predetermined ΔV and tan δ

The ΔV in this invention means a coefficient of swell (%) obtained by immersing a test piece in toluene at 40° C. for 24 hours and is represented by the formula:

$$\Delta V(\%)=[(V_y-V_x)/V_x]\times 100$$

wherein $V_x$ is a volume of the surface printing layer before immersing, and $V_y$ is a volume after immersing. The test piece is made by cutting off a part of the surface printing layer or is made from the same material as that of the surface printing layer according to the same method.

The ΔV of the surface printing layer obtained by immersing in toluene under the above condition is 70 to 170%, preferably 90 to 150%.

The tan δ indicates viscoelastic properties observed when a dynamic stress such as sine-wave oscillation is applied to a test piece which is made by cutting off a part of the surface printing layer, or is made of the same material as those of the surface printing layer according to the same method, and as shown in formula (b), it is represented by the ratio of a storage modulus E' to a loss modulus E" in a complex modulus E*, which is represented by the following formula (a).

$$E^*=E'+E'' \quad (a)$$

$$\tan\delta=E''/E' \quad (b)$$

wherein i is an imaginary number and represented by the formula:

$$i=(-1)^{1/2}.$$

The measuring condition of the tan δ in this invention is as follows; temperature: 23° C., frequency: 10 Hz, amplitude: 50 μm, length between chucks: 20 mm, initial strain: 2 mm extension.

It is preferred that the ΔV and tan δ of the surface printing layer satisfy the relation represented by the formula (1), preferably formula (2). When the ΔV and tan δ do not satisfy the relation represented by the formula (1), the paper discharging properties of the offset blanket is likely to be deteriorated to cause delamination, or the retention of paper powder and solid applicability are likely to be deteriorated.

Figure 3:
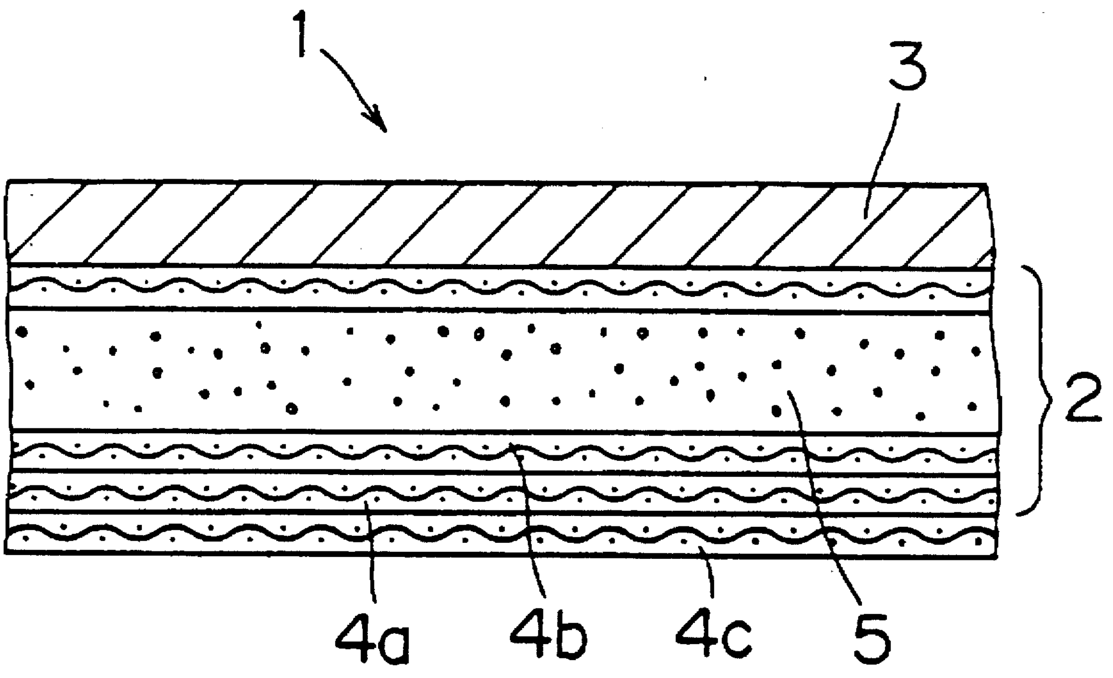
FIG. 3 is a sectional view illustrating one embodiment of the printing offset blanket in this invention.

The printing offset blanket of this invention is, as shown in FIG. 3, composed of a supporting layer 2, which may have a porous compressive layer 5, and a surface printing layer 3 provided on the supporting layer 2.

A rubber layer forming the surface printing layer 3 is prepared by blending various additives in a rubber material, and molding the mixture, followed by vulcanizing.

Examples of the rubber material include synthetic rubbers such as acrylonitrile-butadiene rubber (NBR), hydrogenated NBR, chloroprene rubber (CR), polyurethane rubber, acrylic rubber, etc., or a mixture of at least two sorts of these synthetic rubbers, or a mixture of at least one sort of these synthetic rubbers and a polysulfide rubber. Among the above rubber materials, NBR is suitably used in this invention, because of it's elastic modulus and high oil resistance.

Furthermore, examples of the additive include vulcanizing agents, vulcanization accelerators, auxiliary vulcanization accelerators, fillers, reinforcers, softeners, plasticizers, antioxidants, etc.

As a vulcanizing agent, for example, there can be used organic peroxides, as well as sulfur, organic sulfur-containing compound, etc. Examples of the organic sulfur-containing compound include tetramethylthiuram disulfide, N,N-dithiobismorpholine, etc. Furthermore, examples of the organic peroxide include benzoyl peroxide, etc. The amount of the vulcanizing agent to be added is normally 0.3 to 4 parts by weight, preferably 0.5 to 3 parts by weight, based on 100 parts by weight of the rubber material.

Examples of the vulcanization accelerator include inorganic accelerators such as calcium hydroxide, magnesia (MgO), litharge (PbO), etc. and organic accelerators such as thiurams (e.g. tetramethylthiuram disulfide, tetraethylthiuram disulfide, etc.), dithiocarbamates (e.g. zinc dibutyldithiocarbamate, zinc diethyldithiocarbamate, etc.), thiazoles (e.g. 2-mercaptobenzothiazole, N-dicyclohexyl-2-benzothiazole sulfenamide, etc.), thioureas (e.g. trimethylthiourea, N,N'-diethylthiourea, etc.).

Examples of the auxiliary vulcanization accelerator include metallic oxides such as zinc oxide, etc.; fatty acids such as stearic acid, oleic acid, cottonseed fatty acid, etc.; and vulcanization accelerators which have hitherto been known.

Examples of the reinforcer or filler include zinc oxide, calcium carbonate, silica, magnesium carbonate, magnesium silicate, barium sulfate, clay, carbon black, etc.

Examples of the softener include fatty acid (e.g. stearic acid, lauric acid, etc.), cottonseed oil, tall oil, asphalt substance, paraffin wax, etc. Examples of the plasticizer include dioctyl adipate, dioctyl phthalate, dibutyl phthalate, tricresyl phosphate, etc. Examples of the antioxidant include imidazoles such as 2-mercaptobenzimidazole, etc.; amines such as phenyl-α-nephthylamine, N,N'-di-β-naphthyl-p-phenylenediamine, N-phenyl-N'-isopropyl-p-phenylenediamine, etc.; phenols such as di-t-butyl-p-cresol, styrenated phenol, etc.

The supporting layer 2 is prepared by laminating a plurality of supporting bases 4*a*, 4*b* and 4*c*, which are impregnated with a rubber cement, and at least one compressive layer 5, which is optionally provided.

The supporting bases 4*a*, 4*b* and 4*c* are woven fabrics of cotton, polyester, rayon, etc. Examples of the rubber cement to be impregnated include acrylonitrile-butadiene rubber, chloroprene, etc. The rubber cement contains a predetermined amount of a vulcanizing agent, a vulcanization accelerator and, if necessary, a thickener. The rubber cement is coated on the above woven fabric using a blade coating method. Then, the above rubber material for forming the surface printing layer is applied on the surface of the supporting layer 2 through a primer layer (not shown), followed by drying to form a surface printing layer 3. Thereafter, the resulting laminate is vulcanized by heating at a predetermined temperature under a predetermined pressure to obtain an offset blanket 1 having a compressive layer 5 in the supporting layer 2.

The compressive layer 5 is formed as follows. That is, a rubber cement in which a water-soluble powder such as sodium chloride is dissolved is applied on at least one middle supporting substrate and, after drying and vulcanizing, the substrate was dipped in hot water at 60 to 100° C. for 6 to 10 hours and the water-soluble powder is eluted and dried.

The offset blanket 1 thus obtained is used after adhering on the peripheral surface of a transfer cylinder, directly or through a lining material.

In the offset blanket obtained as described above, the kind and amount of the rubber material and additive forming the surface printing layer may be adjusted in order to obtain a surface printing layer having the ΔV and tan δ which satisfy the relation of the formula (1). For example, there can be used a method of adjusting the amount of an inorganic additive to be formulated, as described in the following item (III), but is not limited thereto. Furthermore, it is also possible to adjust by the combination of NBR and other rubber materials (e.g. polysulfide rubber, etc.), adjustment of the amount of softeners and/or plasticizers, etc.

(II) Surface printing layer having predetermined Hs and tan δ

The value of the hardness Hs of the surface printing layer in this invention is an international rubber hardness degree (IRHD) obtained by measuring the rubber material to be used for the surface printing layer according to ASTM D1415-83.

The Hs in this invention is a value at a temperature of 23° C., and a preferable range of the Hs under this condition is 40 to 80, more preferably 50 to 75. When the value of the Hs is larger than this range, the solid applicability is deteriorated. On the other hand, it is smaller than this range, the register is also deteriorated.

When the relation between the Hs and tan δ of the surface printing layer does not satisfy the formula (3), the paper discharging properties of the surface printing layer are deteriorated. As a result, the respective characteristics such as solid applicability, retention of paper powder and durability are likely to be deteriorated, similar to the above item I.

The offset blanket in this embodiment can be produced according to the same manner as that described in the item I. In that case, the kind and amount of the rubber material and additive forming the surface printing layer may be adjusted according to the same manner as that described in the above item I in order to obtain a surface printing layer having the Hs and tan δ which satisfy the relation of the formula (3). For example, there can be used a method of adjusting the amount of an inorganic additive to be added, as described in the following item (III). Furthermore, it is also possible to adjust by the combination of NBR and other rubber materials (e.g. polysulfide rubber, etc.), adjustment of the amount of softeners and/or plasticizers, etc. The offset blanket obtained in the embodiment I may satisfy this condition of the embodiment II, simultaneously.

(III) Adjustment of amount of inorganic additive

The surface printing layer in this embodiment is formed of a rubber composition comprising 100 parts by weight of a rubber material, 10 to 1 parts by weight of a zinc oxide and not more than 15 parts by weight of an inorganic filler or reinforcer other than zinc oxide.

When the amount of the inorganic filler or reinforcer other than zinc oxide to be added exceeds 15 parts by weight, the paper discharging properties become inferior and, at the same time, the paper powder is liable to be accumulated. The amount of the inorganic filler or reinforcer to be added is preferably not more than 10 parts by weight, more preferably not more than 5 parts by weight. Even if the amount of the inorganic filler or reinforcer to be added is within this range, the smaller the total amount to be added, the better. That is, it is most preferred that the filler or reinforcer other than zinc oxide is not added in the rubber material at all.

Examples of the inorganic reinforcer or filler other than zinc oxide include calcium carbonate, silica, magnesium carbonate, magnesium silicate, barium sulfate, clay, carbon black, etc., as described above.

The zinc oxide is surely added in the rubber as the auxiliary vulcanization accelerator, or filler or reinforcer. However, when the amount to be added exceeds the amount required as the auxiliary vulcanization accelerator, the paper discharging properties are likely to be deteriorated and, at the same time, the paper powder is likely to be accumulated. Accordingly, in this invention, it is preferred that the amount of the zinc oxide to be added is small. The amount of the zinc oxide to be added is about 10 to 1 parts by weight, preferably 7 to 1 parts by weight, for 100 parts by weight of the rubber.

As the rubber material in the rubber composition, there can be any one which was described in the item I. Furthermore, as the additive other than the filler and reinforcer (e.g. vulcanizing agents, vulcanization accelerators, auxiliary vulcanization accelerators, softeners, plasticizers, antioxidants, etc.), there can also be used any one which was described in the item I.

The offset blanket in this embodiment can be produced according to the same manner as that described in the item I.

EXAMPLES

The following Examples and Comparative Examples further illustrate this invention in detail but are not to be construed to limit the scope thereof.

Examples 1 to 5 and Comparative Examples 1 to 4

(a) Preparation of supporting layer

A cotton fabric was used as the supporting substrate. After impregnating with NBR so that the film thickness may becomes 0.08 mm, four supporting substrates were laminated each other. Among them, a rubber material obtained by impregnating one supporting substrate which is present at the middle position is prepared according to a leaching method using sodium chloride as the water-soluble powder.

(b) Preparation of surface printing layer

The components shown in Table 1 were mixed in the proportion shown in the same table, and the mixture was dissolved in a toluene-methyl ethyl ketone mixed solvent to prepare a coating solution for surface printing layer. Then, this coating solution was applied on the surface of the above supporting layer, followed by drying to prepare a surface printing layer having a thickness of 0.30 mm.

and the volume change ΔV was measured using SP-1M manufactured by Chow Balance Co..

(Measurement of tan δ of surface printing layer)

A test piece (4 mm in width×30 mm in length×0.3 mm in thickness) was cut from the surface printing layer of the respective offset blankets obtained in the above Examples and Comparative Examples, respectively. A dynamically changing stress (23° C., 10 Hz, amplitude: 50μ, distance between chucks: 20 m, initial strain: 2 mm extension) was applied to this test piece to measure the tan δ using DVE-V4 manufactured by Rheology Co.

The values of the ΔV and tan δ in the above Examples and Comparative Examples are shown in Table 1. In Table 1, DOA is dioctyl adipate. As a vulcanization accelerator, tetraethylthiuram disulfide was used.

TABLE 1

| | AMOUNT (PART BY WEIGHT) | | | | | | | | | |
|---|---|---|---|---|---|---|---|---|---|---|
| | NBR | POLY-SULFIDE RUBBER | SULFUR | AUXILIARY VULCANIZATION ACCELERATOR | ZINC OXIDE | HYDRATED SILICIC ACID | DOA | STEARIC ACID | ΔV (%) | tan δ |
| EX. 1 | 85 | 15 | 2.5 | 3.5 | 5 | 30 | 10 | 0.5 | 112 | 0.13 |
| EX. 2 | 85 | 15 | 2.5 | 3.5 | 5 | 20 | 10 | 0.5 | 120 | 0.11 |
| EX. 3 | 85 | 15 | 2.5 | 3.5 | 5 | 10 | 10 | 0.5 | 131 | 0.10 |
| EX. 4 | 70 | 30 | 2.5 | 3.5 | 5 | 30 | 10 | 0.5 | 100 | 0.10 |
| EX. 5 | 80 | 20 | 2.5 | 3.5 | 5 | 10 | 10 | 0.5 | 120 | 0.09 |
| COMP. EX. 1 | 100 | 0 | 1.0 | 3.5 | 5 | 30 | 10 | 0.5 | 157 | 0.14 |
| COMP. EX. 2 | 100 | 0 | 2.5 | 4.0 | 5 | 30 | 10 | 0.5 | 124 | 0.15 |
| COMP. EX. 3 | 95 | 5 | 1.5 | 3.0 | 5 | 20 | 10 | 0.5 | 133 | 0.13 |
| COMP. EX. 4 | 95 | 5 | 2.5 | 3.5 | 5 | 5 | 10 | 0.5 | 148 | 0.10 |

(c) Vulcanization and molding

The surface printing layer was dried, molding with heating at a temperature of 150° C. under a pressure of 1 kg/$cm^2$, and then polished so that a ten-point average roughness (Rz, JIS B 0601-1982) of the surface of the surface printing layer may be 3 to 6 μm to obtain an offset blanket.

(Measurement of volume change of surface printing layer)

A test piece (50 mm in width×50 mm in length×0.3 mm in thickness) was cut from the surface printing layer of the respective offset blankets obtained in the above Examples and Comparative Examples, respectively. This test piece was swelled by immersing in toluene at 40° C. for 24 hours (Printing test)

In order to evaluate the paper discharging properties, the retention of paper powder and the printing characteristics of the offset blanket obtained in Examples 1 to 5 and Comparative Examples 1 to 4, the printing test was conducted.

The test was conducted by winding the resulting offset blanket (thickness: 1.90 mm) on a transfer cylinder of an offset press (model 560, manufactured by Ryobi Co., Ltd.) and printing on a coat paper ("Yutoriro Coat 110 kg", manufactured by Daio Seishi Co., Ltd.). As ink for printing, "Mark V New" manufactured by Toyo Ink Co., Ltd. was used, and a printing speed was 10,000 pieces/hour.

The results of the printing test are shown in Table 2.

TABLE 2

| | PAPER DISCHARGING PROPERTIES | SOLID APPLI-CABILITY | RETENTION OF PAPER POWDER | DURABILITY |
|---|---|---|---|---|
| EX. 1 | ○ | Δ | Δ~○ | Δ~○ |
| EX. 2 | ◎ | Δ~○ | Δ~○ | ○ |
| EX. 3 | ◎ | ○ | ○ | ○ |
| EX. 4 | ◎ | ○~◎ | ◎ | ○ |
| EX. 5 | ◎ | ○~◎ | ◎ | ○ |
| COMP. EX. 1 | X | X | X | X |
| COMP. EX. 2 | X~Δ | X | X | X |

TABLE 2-continued

| | PAPER DISCHARGING PROPERTIES | SOLID APPLI-CABILITY | RETENTION OF PAPER POWDER | DURABILITY |
|---|---|---|---|---|
| COMP. EX. 3 | X~Δ | Δ | X | X~Δ |
| COMP. EX. 4 | X~Δ | Δ | X~Δ | X~Δ |

In Table 2, the respective characteristics were evaluated according to the following formula.

(a) Paper discharging properties (delamination)

Ten coat papers printed in solid printing were laminated to measure a height (h, unit: mm) of the part where the paper is curled. The lower the height of the curling is, the smaller the frequency of delamination, which shows good paper discharging properties.

◎: 0≦h<3

○: 3≦h<5

Δ: 5≦h<7

X: h≧7

(b) Solid applicability

The density distribution of the solid printing portion was examined by the image analysis to determine a standard deviation (n) thereof. The smaller the standard deviation is, the better the solid applicability.

◎: n≦7

○: 7<n≦9

Δ: 9≦n<11 x: n≧11

(c) Retention of paper powder

After 100,000 pieces were printed, paper powder adhered on the surface of the offset blanket was visually evaluated according to the following criteria.

◎: The amount of the paper powder is extremely small.

○: The paper powder is scarcely adhered.

Δ: The paper powder is accumulated in the vicinity of the edge part.

x: The paper powder is accumulated on the whole surface.

(c) Durability

After 5,000,000 pieces was printed by using a web offset printing press, the surface of the offset blanket was visually evaluated according to the following criteria.

○: Cut and wear not observed.

Δ: Little cut and wear were observed.

x: A large amount of cut and wear were observed.

Figure 1:
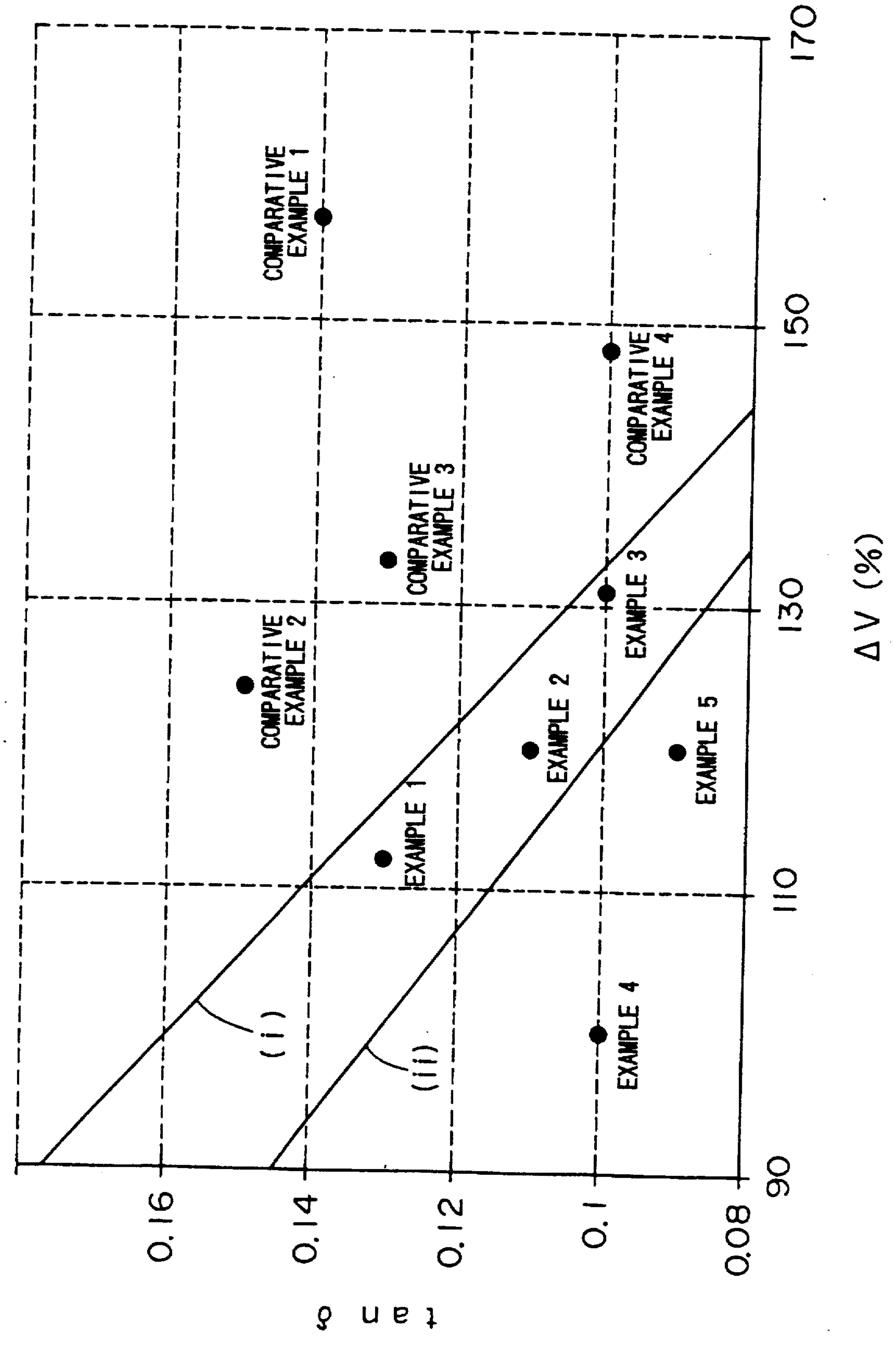
FIG. 1 is a graph illustrating a relation between the ΔV and tan δ of the surface printing layer obtained in Examples 1 to 5 and Comparative Examples 1 to 4.

FIG. 1 is a graph wherein the tan δ and ΔV of the surface printing layer obtained in the respective Examples and Comparative Examples are plotted. In FIG. 1, (i) is a borderline of the range represented by the formula (1), and (ii) is a borderline of the range represented by the formula (2).

As shown in FIG. 1, the printing offset blankets of Examples 1 to 5, which are within the range of the formula (1) are extremely improved in paper discharging properties in comparison with those of Comparative Examples, which are not within the range of the formula (1), and are superior in retention of paper powder, solid applicability and durability.

Furthermore, the printing offset blankets of Examples 4 and 5, which are within the range of the formula (2) in FIG. 1, are superior to those of Examples 1 to 3 in paper discharging properties, retention of paper powder, solid applicability and durability

Examples 6 to 10 and Comparative Examples 5 to 8

According to the same manner as that described in Examples 1 to 5 and Comparative Examples 1 to 4 except for mixing NBR, polysulfide rubber and various additives in the proportion shown in Table 3, offset blankets were obtained.

(Measurement of hardness of surface printing layer)

A test piece (20 mm in width×20 mm in length×0.3 mm in thickness) was cut from the surface printing layer of the respective offset blankets obtained in the above Examples and Comparative Examples. Five test pieces were laminated and the hardness Hs was measured according to ASTM D1415-83, using a microhardness tester manufactured by Whorless Co.

(Measurement of tan δ of surface printing layer)

According to the same manner as that described in Examples 1 to 5, the tan δ was measured.

The values of the Hs and tan δ in the above Examples and Comparative Examples are shown in Table 3. In Table 3, DOA is dioctyl adipate. As a vulcanization accelerator, tetraethylthiuram disulfide was used.

TABLE 3

| | AMOUNT (PART BY WEIGHT) | | | | | | | | | |
|---|---|---|---|---|---|---|---|---|---|---|
| | NBR | POLY-SULFIDE RUBBER | SULFUR | AUXILIARY VULCANIZATION ACCELERATOR | ZINC OXIDE | HYDRATED SILICIC ACID | DOA | STEARIC ACID | Hs (IRHD) | tan δ |
| EX. 6 | 95 | 5 | 1 | 3.5 | 5 | 10 | 10 | 0.5 | 54 | 0.14 |
| EX. 7 | 90 | 10 | 2 | 3.5 | 5 | 10 | 10 | 0.5 | 61 | 0.11 |
| EX. 8 | 70 | 30 | 2 | 3.5 | 5 | 10 | 10 | 0.5 | 66 | 0.08 |
| EX. 9 | 90 | 10 | 1 | 3.0 | 5 | 10 | 15 | 0.5 | 54 | 0.10 |
| EX. 10 | 90 | 20 | 1 | 3.0 | 5 | 10 | 15 | 0.5 | 58 | 0.08 |
| COMP. EX. 5 | 100 | 0 | 2 | 3.5 | 5 | 30 | 10 | 0.5 | 67 | 0.17 |
| COMP. EX. 6 | 100 | 0 | 2 | 3.5 | 5 | 10 | 10 | 0.5 | 56 | 0.15 |
| COMP. | 90 | 10 | 2 | 3.5 | 5 | 30 | 10 | 0.5 | 64 | 0.14 |

TABLE 3-continued

| | AMOUNT (PART BY WEIGHT) | | | | | | | | | |
|---|---|---|---|---|---|---|---|---|---|---|
| | NBR | POLY-SULFIDE RUBBER | SULFUR | AUXILIARY VULCANIZATION ACCELERATOR | ZINC OXIDE | HYDRATED SILICIC ACID | DOA | STEARIC ACID | Hs (IRHD) | tan δ |
| EX. 7 | | | | | | | | | | |
| COMP. EX. 8 | 70 | 30 | 2 | 3.5 | 5 | 20 | 10 | 0.5 | 70 | 0.09 |

(Printing test)

According to the same manner as that in Examples 1 to 5 and Comparative Examples 1 to 4, the printing test was conducted as to the offset blankets obtained in Examples 6 to 10 and Comparative Examples 5 to 8 and the evaluation was conducted. The results are shown in Table 4.

TABLE 4

| | PAPER DISCHARGING PROPERTIES | SOLID APPLI-CABILITY | RETENTION OF PAPER POWDER | DURABILITY |
|---|---|---|---|---|
| EX. 6 | Δ | ○ | Δ | Δ |
| EX. 7 | ○ | ◎ | ○ | Δ |
| EX. 8 | ○~◎ | ◎ | ○ | ○ |
| EX. 9 | ○~◎ | ◎ | ◎ | ○ |
| EX. 10 | ○~◎ | ◎ | ◎ | ○ |
| COMP. EX. 5 | X | X | X | X |
| COMP. EX. 6 | X | X~Δ | X~Δ | X |
| COMP. EX. 7 | X~Δ | X~Δ | X~Δ | Δ |
| COMP. EX. 8 | Δ | X~Δ | Δ | Δ~○ |

Figure 2:
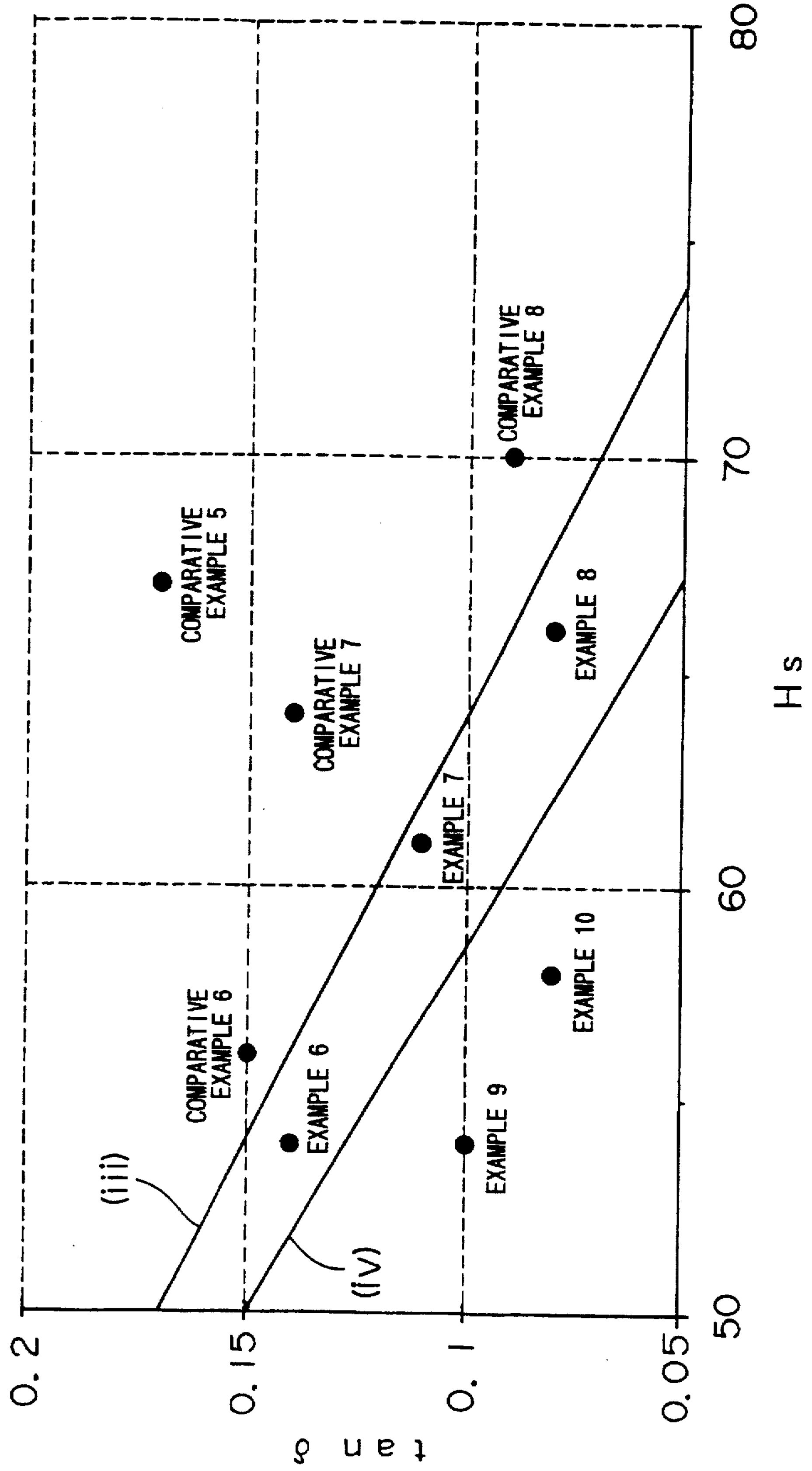
FIG. 2 is a graph illustrating a relation between the Hs and tan δ of the surface printing layer obtained in Examples 6 to 10 and Comparative Examples 5 to 8.

FIG. 2 is a graph wherein the tan δ and Hs of the respective Examples and Comparative Examples are plotted as ordinate and abscissa, respectively. In FIG. 2, (iii) is a borderline of the range represented by the formula (3), and (iv) is a borderline of the range represented by the formula (4).

As apparent from Table 3, Table 4 and FIG. 2, the printing offset blankets of Examples 6 to 10, which are within the range of the formula (3), are superior to those of Comparative Examples 5 to 8, which are not within the range of the formula (3), in paper discharging properties, retention of paper powder, solid applicability and durability. Furthermore, the printing offset blankets of Examples 9 and 10, which are within the range of the formula (4), are more superior to the above offset blankets in the respective characteristics.

Examples 11 to 15 and Comparative Example 9

According to the same manner as that described in Examples 1 to 5 and Comparative Examples 1 to 4 except for mixing the respective components in the proportion shown in Table 5, offset blankets were obtained. In Table 5, DOP is dioctyl phthalate. DOP was added at an amount corresponding to the total amount of the filler and reinforcer other than zinc oxide in order to adjust the hardness. As a vulcanization accelerator, tetraethylthiuram disulfide was used.

TABLE 5

| | AMOUNT (PART BY WEIGHT) | | | | | | |
|---|---|---|---|---|---|---|---|
| | NBR | ZINC OXIDE | HYDRATED SILICIC ACID<br>CARBON BLACK<br>(TOTAL AMOUNT) | DOP | STEARIC ACID | SULFUR | AUXILIARY VULCANIZATION ACCELERATOR |
| EX. 11 | 100 | 5 | 0**<br>0<br>(0) | 0 | 1 | 2 | 3 |
| EX. 12 | 100 | 5 | 5<br>0<br>(5) | 5 | 1 | 2 | 3 |
| EX. 13 | 100 | 5 | 10<br>0<br>(10) | 5 | 1 | 2 | 3 |
| EX. 14 | 100 | 5 | 15<br>0<br>(15) | 10 | 1 | 2 | 3 |

TABLE 5-continued

| | AMOUNT (PART BY WEIGHT) | | | | | | |
|---|---|---|---|---|---|---|---|
| | NBR | ZINC OXIDE | HYDRATED SILICIC ACID CARBON BLACK (TOTAL AMOUNT) | DOP | STEARIC ACID | SULFUR | AUXILIARY VULCANIZATION ACCELERATOR |
| EX. 15 | 100 | 5 | 5<br>5<br>(10) | 5 | 1 | 2 | 3 |
| COMP. EX. 9 | 100 | 5 | 30<br>0<br>(30) | 20 | 1 | 2 | 3 |

**The upper tier shows a value of hydrated silicic acid; the middle tier, carbon black; and the lower tier, total amount to be added.

(Printing test)

The practical test was conducted as to the offset blankets obtained in Examples 11 to 15 and Comparative Example 9. The methods of the printing test and evaluation are the same as those described above.

The results of the printing test in the above Examples and Comparative Examples are shown in Table 6.

TABLE 6

| | PAPER DISCHARGING PROPERTIES | SOLID APPLI-CABILITY | RETENTION OF PAPER POWDER | DURABILITY |
|---|---|---|---|---|
| EX. 11 | ⊚ | ⊚ | ⊚ | ⊚ |
| EX. 12 | ○~⊚ | ○~⊚ | ⊚ | ⊚ |
| EX. 13 | ○ | ○ | ○~⊚ | ⊚ |
| EX. 14 | ○ | ○ | ○~⊚ | ⊚ |
| EX. 15 | ⊚ | ○ | ○~⊚ | ⊚ |
| COMP. EX. 9 | X | X | X~Δ | X |

As apparent from the results shown in Table 6, the smaller the total amount of the filler and reinforcer other than zinc oxide is, the better the paper discharging properties, retention of paper powder, solid applicability and durability are. Particularly, when the filler and reinforcer other than zinc oxide are not added at all, the above respective characteristics are most excellent. Furthermore, the smaller the amount of the filler and reinforcer other than zinc oxide is, the more the mechanical strength of the surface printing layer is liable to be deteriorated. The reason why the durability is improved nevertheless is that it becomes difficult to cause slip between the surface printing layer and paper, which results in a remarkable decrease in wear.

What is claimed is:

1. A printing offset blanket comprising a supporting layer, which may have a porous compressive layer, and a surface printing layer provided on the supporting layer, and the surface printing layer being a rubber layer wherein a volume change ΔV (%) obtained when immersing in toluene at 40° C. for 24 hours and a tan δ obtained when a dynamic stress is applied, satisfy a relation represented by the formula:

$$\tan\delta < -0.0018\times\Delta V + 0.34 \quad (1).$$

2. A printing offset blanket according to claim 1, wherein the surface printing layer is a rubber layer wherein the volume change ΔV (%) and tan δ satisfy a relation represented by the formula:

$$\tan\delta < -0.0015\times\Delta V + 0.28 \quad (2).$$

3. A printing offset blanket comprising a supporting layer, which may have a porous compressive layer, and a surface printing layer provided on the supporting layer, and the surface printing layer being a rubber layer wherein a hardness Hs (IRHD) and a tan δ obtained when a dynamic stress is applied, satisfy a relation represented by the formula:

$$\tan\delta < -0.005\times Hs + 0.42 \quad (3).$$

4. A printing offset blanket according to claim 3, wherein the surface printing layer is a rubber layer wherein the hardness Hs (IRHD) and tan δ satisfy a relation represented by the formula:

$$\tan\delta < -0.0056\times Hs + 0.43 \quad (4).$$

5. A printing offset blanket comprising a supporting layer, which may have a porous compressive layer, and a surface printing layer provided on the supporting layer, and the surface printing layer being formed of a rubber composition consisting of 100 parts by weight of a rubber material, 10 to 1 parts by weight of a zinc oxide and not more than 15 parts by weight of an inorganic filler or reinforcer other than zinc oxide.

6. A printing offset blanket according to claim 5, wherein the inorganic filler or reinforcer is added at an amount of not more than 10 parts by weight for 100 parts by weight of the rubber material.

7. A printing offset blanket according to claim 5, wherein the amount of the inorganic filler or reinforcer to be added is zero.

8. A printing offset blanket according to claim 5, wherein the inorganic filler or reinforcer is selected from the group consisting of calcium carbonate, silica, magnesium carbonate, magnesium silicate, barium sulfate, clay and carbon black.

* * * * *